United States Patent [19]
Nenov

[11] Patent Number: 5,924,307
[45] Date of Patent: Jul. 20, 1999

[54] TURBINE/MOTOR (GENERATOR) DRIVEN BOOSTER COMPRESSOR

[75] Inventor: Neno Todorov Nenov, Williamsville, N.Y.

[73] Assignee: Praxair Technology, Inc., Danbury, Conn.

[21] Appl. No.: 08/858,632

[22] Filed: May 19, 1997

[51] Int. Cl.[6] .................................................... F25J 3/04
[52] U.S. Cl. ............................................... 62/643; 62/651
[58] Field of Search ............................... 62/643, 649, 650, 62/651, 652

[56] References Cited

U.S. PATENT DOCUMENTS

| | | | |
|---|---|---|---|
| 3,477,239 | 11/1969 | Rische | 62/640 |
| 4,133,662 | 1/1979 | Wagner . | |
| 4,670,031 | 6/1987 | Erickson . | |
| 4,769,055 | 9/1988 | Erickson . | |
| 4,817,393 | 4/1989 | Erickson . | |
| 5,263,328 | 11/1993 | Rohde . | |
| 5,289,688 | 3/1994 | Agrawal | 62/651 |
| 5,363,657 | 11/1994 | Naumovitz | 62/651 |
| 5,460,003 | 10/1995 | Nenov | 62/651 |
| 5,467,613 | 11/1995 | Brasz | 62/402 |
| 5,515,688 | 5/1996 | Rieth | 62/651 X |
| 5,582,033 | 12/1996 | Bonaquist et al. | 62/643 |
| 5,582,034 | 12/1996 | Naumovitz | 62/652 |
| 5,689,973 | 11/1997 | Naumovitz et al. | 62/652 |
| 5,711,167 | 1/1998 | Ha et al. | 62/652 |

FOREIGN PATENT DOCUMENTS

672877A1  9/1995  European Pat. Off. .

OTHER PUBLICATIONS

K. Reuter, "Integrated Machinery Systems for Cryogenic Processes Consisting of Turboexpander, Compressor, High Frequency Motor and Generator with Magnetic Bearings", Proceedings of the 1997 IEE Colloquium on High Speed Bearings for Electrical Machines, Apr. 25, 1997.

B. Keenan and K. Reuter, "Meeting the Challenge of Variable Liquid Demands".

*Primary Examiner*—Christopher B. Kilner
*Attorney, Agent, or Firm*—Bernard Lau

[57] ABSTRACT

A compressor assembly for cryogenic gas separation wherein the assembly comprises a compressor, an expansion turbine and an electric motor integrally connected via a gear drive, and processes for using the compressor assembly.

16 Claims, 5 Drawing Sheets

TURBINE/MOTOR (GENERATOR) DRIVEN BOOSTER COMPRESSOR

FIELD OF THE INVENTION

This invention relates to a turbine/motor (generator) driven booster compressor and more particularly to a unified assembly comprising a cryogenic expansion turbine assisted by an electric motor/generator, driving booster compressor, and the process of using the assembly.

BACKGROUND OF THE INVENTION

In the past, turbine power below 100 hp has been seldomly used in air separation processes because of the prohibitive cost of the generator and associated hardware. Many nitrogen (or oxygen) producing plants use a product compressor to boost the product pressure according to the customer specifications. Some nitrogen plants (with waste expansion), on the other hand, do not have a product compressor and are designed to operate with higher overall pressure, which is determined by the required pressure of the product nitrogen. The waste expansion plants require more energy and, therefore, are less economical to operate. However, this inefficiency has been justified by the capital cost savings associated by eliminating the product compressor. In general, it is desirable for cryogenic air separation plants to have a refrigeration producing expander (turbine) to be self sustainable.

For liquid production using a gas producing plant, it is desirable to increase the size of the turbine and then to modify the process accordingly. Generally, the process engineer cannot increase the size of the turbine independent of other process requirements. Thus, the amount of liquid produced and, many times, especially during hot ambient temperatures days, the capacity of a plant to produce the product gas itself becomes restricted, partly due to refrigeration limitations. Accordingly, it would be beneficial to control the amount of the refrigeration produced according to the requirements of a particular system. Controlling refrigeration by varying the turbine power, without otherwise affecting the process, was not practiced, because such a device was not available.

The effectiveness of small to medium size gas producing plants can be improved if the turbine power is used in other parts of the plant by driving, for example, a booster compressor, which is used to compress either the product stream or even the feed air itself. The problem in the past, aside from capital cost, has been to match the speed and power of both turbine and compressor stages. The booster compressor operating parameters, including pressures (head), flow and power, are mandated by the respective (compressing) stream requirements, either product stream or feed air stream. High efficiency operation usually determines the compressor size and its optimum speed. These booster compressor requirements are independent and decoupled from the turbine operating head, flow and power requirements, which are dictated by other process objectives.

Both turbine and compressor must be allowed to run at their optimum speeds for best efficiency operation. The speeds and powers of the turbine and compressor do not usually match. In the past one would size the turbine first, and then tailor the process to size the booster around the turbine. Usually, one or more process qualities, like flow, speed and/or efficiency is compromised. In the case of a generator loaded capital and operating costs are determinative in developing air separation processes. As a result, turbine power below 100 hp has traditionally been viewed to be uneconomical to recover, and was thrown away, wasted.

As indicated above, in smaller-to-medium size plants, the turbine power was not used, but wasted in a heat rejection loop. If, and when, that power was used to drive a compressor, returning the energy back to the process, it was frequently done with a compromise of the compressor performance, because the powers and speeds of both turbine and compressor would rarely match. Loading the turbine with an electric generator, when economically feasible is still less effective than directly with a compressor.

However, applicant is aware of no art describing the teachings of the present invention, namely, a combination of a cryogenic turbine with an electric motor/generator and a compressor stage (or stages) in one device, with a gear case, to provide optimal operation of both the cryogenic turbine and the compressor. Installing a cryogenic turbine on a warm end machine, such as base load air compressor or gear case, is not practical, because of logistic difficulties with routing and insulating the cryogenic turbine piping at or near the warm end equipment. The latter is usually physically located some distance from the cold box, housing the turbine duct and all cryogenic piping.

The prior art addresses various aspects of expander apparatus design and application. For example, compressor loaded turbine (compander) applications in the cryogenic process industries, and generator loaded cryogenic turbines are known in the art. The use of companders is known in air separation plants for producing low pressure gaseous oxygen and/or nitrogen products. For example, in U.S. Pat. No. 5,268,328, electrical motor is combined with a warm, process air turbine to drive a compressor.

U.S. Pat. No. 4,817,393 discloses that there is little cost difference between driving a small warm end air compressor or an electric generator with that shaft power output. U.S. Pat. No. 4,769,055 discloses that the incremental compression obtained in the warm end compressor is very economical, because the drive power is "free" and the capital cost of the compander is little different from the capital cost of an expander with some other means of absorbing the power developed.

OBJECTS OF THE INVENTION

It is therefore an object of this invention to provide an electric motor/generator assisted cryogenic turboexpander driving a booster compressor combination in one machine, which may be effectively employed in a cryogenic production cycle.

It is another object of this invention to identify cryogenic production cycle, which can effectively employ this cost effective electric motor/generator assisted turboexpander driven booster compressor with state of art efficiency.

It is yet another object of this invention to provide a reliable and rugged cryogenic turboexpander that requires low capital cost and low maintenance cost.

It is yet another object of this invention to provide a turboexpander that can be utilized in plants and cycles producing oxygen and/or nitrogen through separation of air by cryogenic distillation.

It is another object of this invention to increase refrigeration production from a cost effective decoupling of the turbine size (power) from the other process equipment.

SUMMARY OF THE INVENTION

This invention is a gas compression assembly for a refrigeration system. The assembly comprises an electric motor/generator, a compressor and an expansion turbine integrally connected via a gear drive. The expansion turbine has a turbine inlet and a turbine outlet, such that the operating temperature of the compression assembly is less than about 250 K in the turbine inlet. The operating temperature of the turbine outlet is less than about 150 K, and preferably less than 100 K. The refrigeration system may provide refrigeration to liquefy at least one gaseous component, or for gas separation from at least one gaseous mixture into at least one gaseous component. A controlling means regulates at least one portion of the gas passing in series through the compressor to the turbine.

This invention is also directed to a refrigeration process comprising the steps of passing a gaseous mixture into at least one gaseous product and passing a portion of the gaseous product into an expansion turbine of a compression assembly having a turbine, a compressor and an electric motor/generator integrally connected via a gear drive. The turbine has a turbine inlet and a turbine outlet such that the operating temperature is less than about 250 K in the turbine inlet. The operating temperature in the turbine outlet is less than about 150 K, and preferably less than 100 K. At least one portion of the gaseous mixture passes through the compressor to emerge as at least one compressed gaseous mixture. The cryogenic rectification column system may comprise a single column and a top condenser, wherein at least a portion of the gaseous mixture passes through the single column to emerge as at least one purified gaseous product. The purified gaseous product comprises a highly enriched gaseous product of greater than from about 95% purity and a moderately enriched gaseous product of between from about 55% to about 75% purity. The cryogenic rectification column system may comprise a lower column, an upper column and a main condenser, wherein at least one purified gaseous product emerges from the condenser to pass through the compressor, and then to the expander.

BRIEF DESCRIPTION OF THE DRAWINGS

Other objects, features and advantages will occur to those skilled in the art from the following description of the preferred embodiments and the accompanying drawings, in which.

DETAILED DESCRIPTION OF THE INVENTION

This invention will be described in detail with reference to the drawings.

Figure 1:
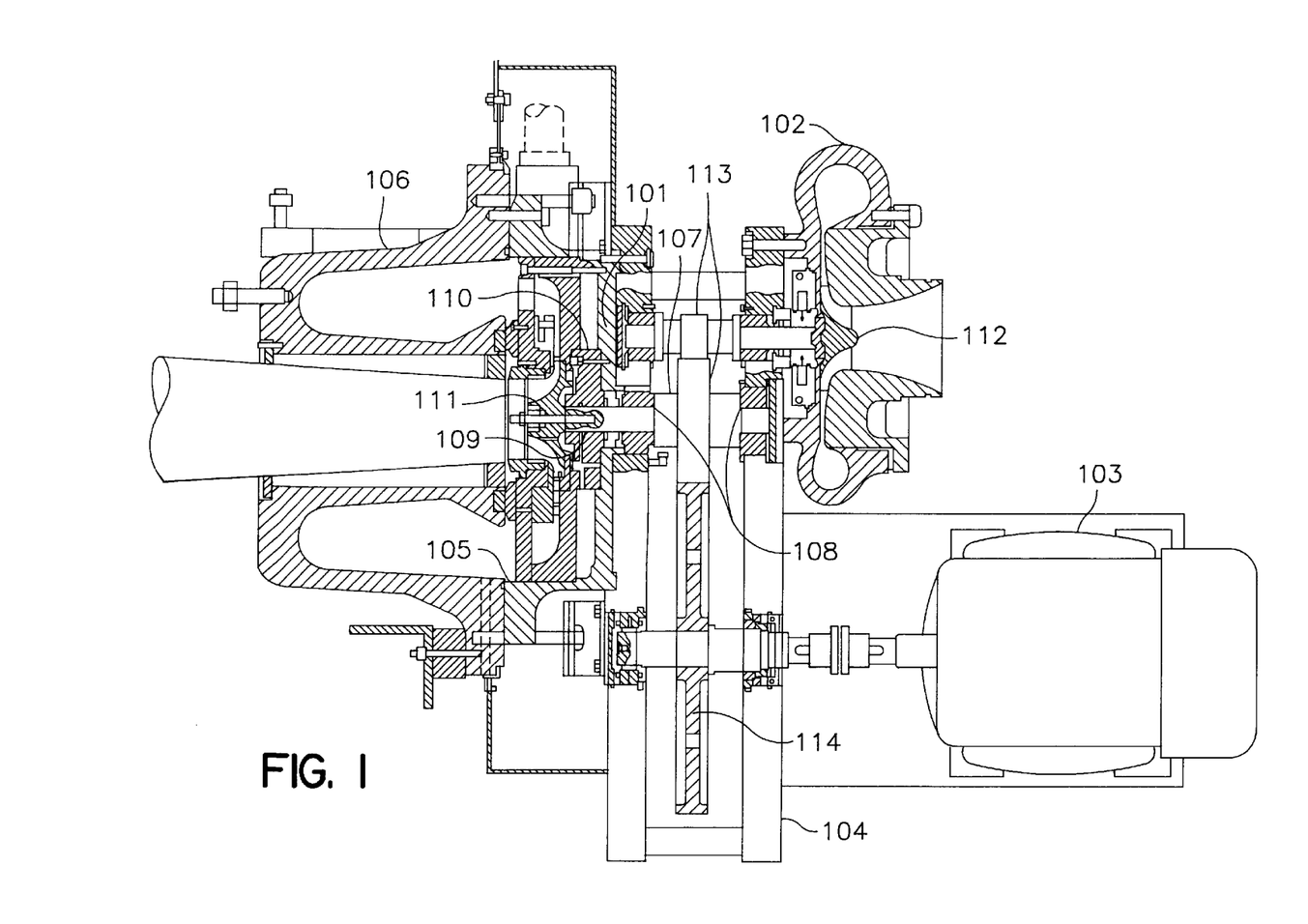
FIG. 1 is a cross-sectional assembly drawing of turbine/electrical motor assisted booster compressor.

Cross-sectional assembly view of the subject electric motor/generator assisted, cryogenic turbine driven booster compressor. Turbine 101, compressor 102 and electric motor/generator 103 are attached to gear case 104. The turbine comprises of cartridge 105 and turbine housing 106. Rotor 107, of turbine 101 rotates in turbine bearings 108, centered and housed in gear case 104. Expander-end shaft seal 109 is retained in, and centered by, turbine cartridge 105, which itself is centered in gear case 104.

The gear case is horizontally split for easy replacement and servicing of the individual components without disturbing the rest of the gear case. The turbine cartridge can be removed from the turbine housing and the gear case after removing the gear case lid without disturbing the cold box insulation. The gear case, housing the turbine, booster compressor and the electric motor/generator of the present invention is located preferably in close proximity, and adjacent, to the "cold box", i.e. where one normally would have located the turbine itself, see FIG. 1.

This arrangement is economically preferable, because it affords the utilization of an "ordinary" turbine stage and minimizes the potential heat leak loses into the turbine and its (cold cryogenic) piping, in that the turbine housing is "submerged" into the cold box and thermally insulated by the perlite or some other kind of thermal insulation. It is preferable to locate the booster compressor close to the cold box and next to the turbine itself.

The booster compressor stage and the electric motor/generator are located on the opposite (of the turbine and cold box) side of the gear case, together with all of the warm end (booster compressor) piping. The gear case is horizontally split for an independent access to each of the major components, i.e. turbine, compressor, electric motor or gears and bearing housings. Thus, by removing the gear case cover one can easily access and independently remove any one of the components without affecting the other two.

The turbine is connected to the compressor by the gear drive. The operating temperature in the inlet of the turbine is less than about 250 K. After the gas passes through the turbine, the operating temperature in the turbine outlet is less than about 150 K, preferably less than about 100 K.

Cryogenic expander thermal shield 110 is situated in the turbine cartridge between the warm region of the gear case and the cold expander wheel 111. This is necessary for two reasons: first, to protect the lube-oil in the bearings from freezing, which would jeopardize the machine functionality; and second, to prevent heat from leaking into the process fluid, which would unnecessarily reduce the expander efficiency and performance.

Expander housing 106 provides means for the process fluid introduction and exit from the hereto described turboexpander. Additional compression stages may be utilized, driven by motor drive 114 or another mechanism. Turbine 101 is loaded with compressor wheel 112 and a compressor stage 102, via set of gears 113, located in gear case 104. Another gear 114 connects the turbine rotor to the electric motor/generator 103, which provides the additional work input for the compressor or absorbs the excess turbine power, according to the process requirements.

If the turbine driving the compressor stage is operated in parallel with an electric motor via a geared drive as shown in FIG. 1, we can save on the capital cost of the plant and also improve the energy efficiency of the process itself. Directly loading a cryogenic (or any process) turbine with a compressor stage is more efficient than with an initial installation of an electric generator alone, because this is a more direct method of recovering the initial energy input from the expanding fluid stream. It avoids the inefficiency associated with conversion between energy derived from the cryogenic turbine and electrical energy.

A geared drive allows both the turbine and the compressor to operate at their respective optimum speeds independently. An asynchronous electric motor/generator makes up the power difference of the two stages automatically, i.e. if the turbine generates less power than the compressor requires, the electric motor will supply the difference. On the other hand, where excess power is available, the electric motor will run as a generator (the difference being only a few revolutions per minute, RPM) and convert the excess power into electrical energy. This is done automatically and without the need for additional controls.

Where applicable, in plants requiring a product compressor, this arrangement affords elimination of the capital cost of an additional booster compressor apparatus, in that the load compressor of the turbine can be the product booster compressor apparatus. The capital savings here include not only the first cost of the compressor hardware itself, but also all the costs associated with the skid, piping, cooling (water), electrical connections, foundation, controls, etc., often independent from the product booster compressor apparatus.

This arrangement enables both the compressor and the turbine to independently operate at or near their optimum efficiency. It allows optimum speed for either the compressor or the turbine stage regardless of the mismatched power values of the two rotors. The alternating current induction electric motor automatically fills in the difference of the powers of the two rotors by operating as either motor or generator.

A controlling means enables the compression assembly to operate at optimum efficiency. The controlling means may be used to regulate the pressure of at least a portion of the gas passage through the turbine. The controlling means may be a computerized mechanical device known to the skilled artisan.

The gas compression assembly enables the plant to provide refrigeration to liquefy at least a gaseous component and/or to provide refrigeration for gas separation from at least a gaseous mixture into at least a gaseous component.

Figure 2:
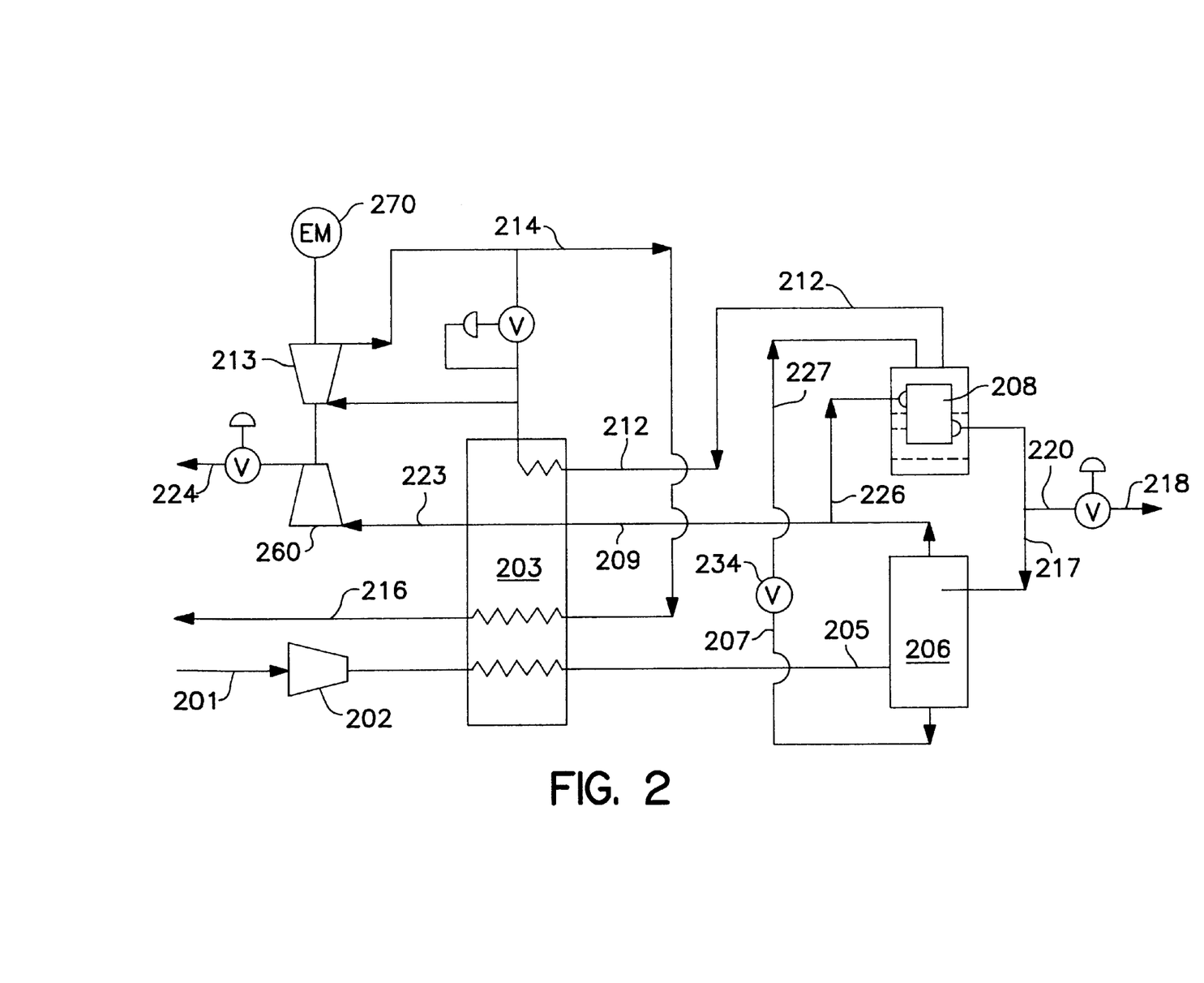
FIG. 2 is a flow schematic diagram of waste expansion nitrogen plant with product compressor.
Figure 3:
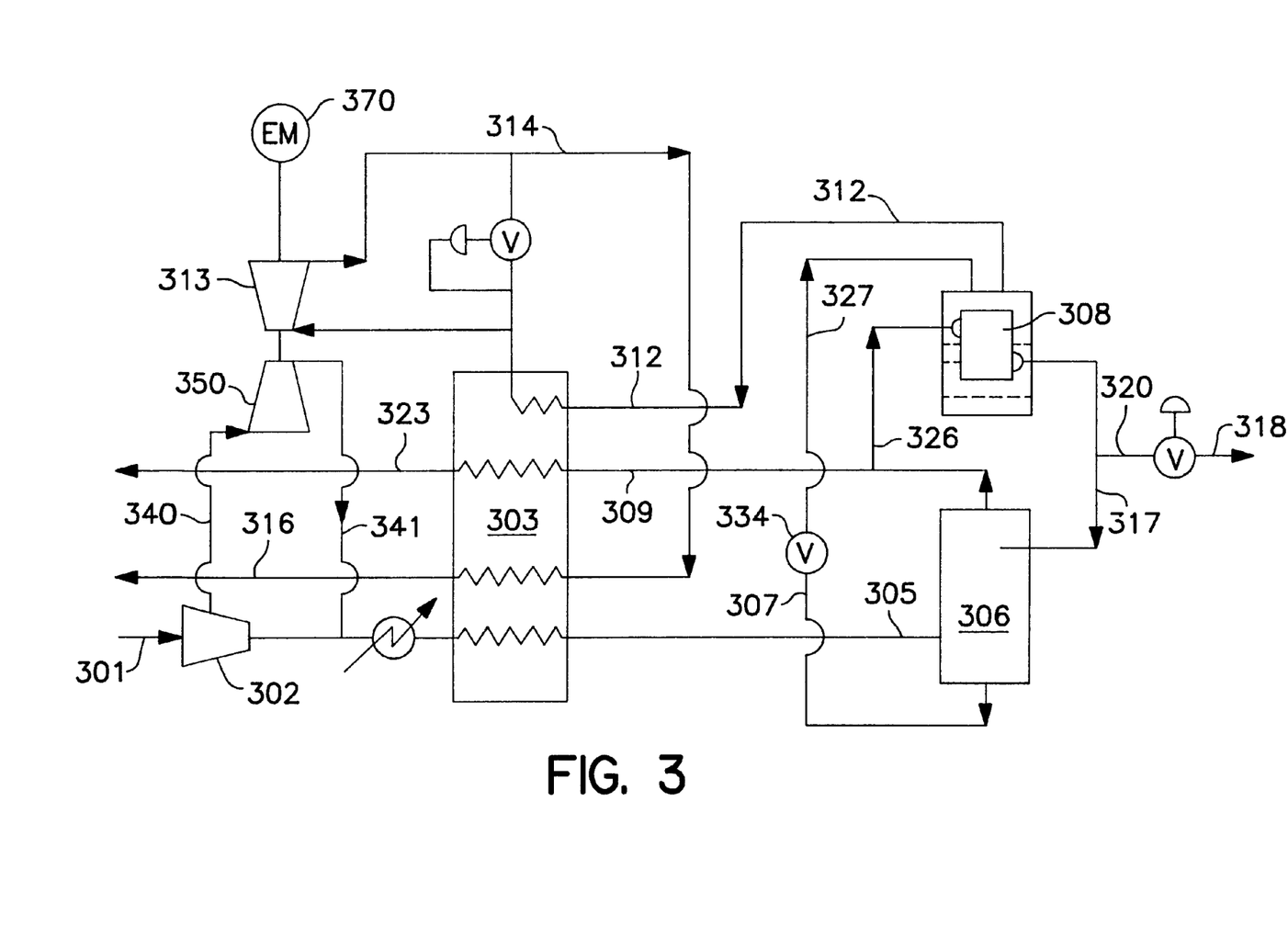
FIG. 3 is a flow schematic diagram of waste expansion nitrogen plant with partial feed air stream booster compressor.

FIG. 2 represents an embodiment of a waste expansion cryogenic nitrogen production system with a product compressor, driven by an expansion turbine and an electric motor/generator according to this invention. It is presented for illustrative purposes and it may be employed with any suitable cryogenic rectification plant. It is particularly useful in a waste expansion cryogenic nitrogen production cycle. Waste stream from a rectification column is expanded to generate refrigeration and the expanded waste stream is passed in indirect heat exchange with incoming feed air to cool the feed air and thus provide refrigeration into the rectification column system to drive the rectification. The present invention redefines the applicability range of the waste expansion nitrogen producing plants also, because their energy consumption per unit gaseous product is improved. FIG. 2 represents such an application with a product booster compressor and an electric motor/generator according to the teachings of this invention. These plants, traditionally, have had no product compressor, but the electric motor/turbine assisted booster stage of this invention can be used as one of the stages of the feed air machine, or to compress a fraction of the feed air stream only, as shown in FIG. 3.

Referring now to FIG. 2 gaseous mixture containing nitrogen and oxygen, i.e., feed air 201 is compressed in base load feed air compressor 202, and then passed through main heat exchanger 203. Within main heat exchanger 203 the compressed feed air is cooled by indirect heat exchange with expanded waste fluid as will be discussed in greater detail later. The compressed and cooled feed air, which is also cleaned of high boiling impurities such as water vapor and carbon dioxide, is then passed as stream 205 into a cryogenic rectification column system.

The cryogenic rectification column system illustrated in FIG. 2 comprises single column 206 and top condenser 208. It is preferred that the cryogenic rectification plant comprise one column although plants comprising more than one column may be employed. Column 206 preferably is operating at a pressure within the range of from 40 to 140 pounds per square inch absolute (psia).

Within column 206 the feed air is separated by cryogenic rectification into nitrogen gas stream 209 and enriched oxygen liquid stream 207. The nitrogen gas stream is withdrawn from the upper portion of column 206 generally having a purity of greater than about 95% nitrogen, and preferably in the range of from about 98% nitrogen to about 99.9999% nitrogen or greater. Portion 226 of nitrogen gas stream 209 is passed into top condenser 208 wherein it is condensed against an enriched oxygen liquid stream and then passed as stream 217 back into column 206 as reflux. If desired, portion 220 of liquid nitrogen stream 217 may be recovered as liquid nitrogen product 218. The enriched oxygen liquid stream, having a nitrogen concentration generally within the range of from about 55% to about 75%, and preferable from about 60 to about 70%, is removed from the lower portion of column 206 as enriched oxygen liquid stream 207, reduced in pressure through valve 234, and passed as stream 227 into top condenser 208 wherein it boils to carry out the condensation of nitrogen gas stream 226.

The withdrawn nitrogen gas stream 209 is warmed by passage through main heat exchanger 203 in indirect heat exchange with feed air to cool the feed air. Thereafter, warmed nitrogen gas stream 223 is then compressed by passage through booster product compressor 260, driven by both electric motor 270 and cryogenic expander 213 to result in high pressure nitrogen product 224, which may be recovered.

Nitrogen-containing waste fluid is withdrawn from top condenser 208 of the rectification column system as stream 212 which then partially traverses main heat exchanger 203 and is then expanded through turbo expander 213 to a pressure within the range of from 20 psia to atmospheric pressure. Expander 213 is coupled to a nitrogen product compressor and an electric motor. In such a directly coupled expander-compressor system, both devices are connected mechanically with or without a gear system so that the energy extracted from the expanding gas stream is passed directly by the expander via the compressor to the compressed product nitrogen gas. An electric motor of suitable frame and size supplements the cryogenic expander to drive the product compressor. The motor, expander, and compressor are interconnected mechanically via the gear sets situated in the gear box of the present invention. This arrangement minimizes both extraneous losses and capital expenditures associated with an indirect energy transfer from the expander to the compressor via an intermediate step of, for example, electric generation. Waste fluid 212 passes through and drives expander 213, which then partially drives the compressor for compressing the product nitrogen. Simultaneously, the expanding waste fluid is cooled by passage through turbo expander 213.

Cooled expanded waste fluid 214 is then warmed by passage through main heat exchanger 203 in indirect heat exchange with feed air to cool the feed air, thus providing refrigeration into the cryogenic rectification column system with the feed air to drive or carry out the cryogenic rectification. The resulting warmed waste fluid is then removed from main heat exchanger 203 as waste stream 216 and discarded.

FIG. 3 represents another particular embodiment of a waste expansion plant with fraction of the gaseous mixture containing nitrogen and oxygen, i.e., feed air stream, compressed by the turbine/motor driven booster compressor of this invention. It is presented for illustrative purposes and may be employed with any suitable cryogenic rectification plant.

Referring now to FIG. 3, only a fraction of the feed air stream 301 bypasses the last stage of the base load air compressor 302. Bypass fraction 340 of feed air is compressed by booster compressor 350 emerging as fraction 341, such that the discharge pressure of main feed air machine 302, that being within the range of from 40 to 140 pounds per square inch absolute (psia). The flow rate of bypass fraction stream 340 is determined by the available power output from cryogenic turbine 313 and the availability of a suitable frame size electric motor 370 for the particular application. After recombining, the two feed air streams pass through main heat exchanger 303. Within main heat exchanger 303 the compressed feed air is cooled by indirect heat exchange with expanded waste fluid as will be discussed in greater detail later. The compressed and cooled feed air, which is also cleaned of high boiling impurities such as water vapor and carbon dioxide, is then passed as stream 305 into a cryogenic rectification column system.

The cryogenic rectification column system illustrated in FIG. 3 comprises single column 306 and top condenser 308. It is preferred in the practice of this invention that the cryogenic rectification plant comprise one column although plants comprising more than one column may be employed. Column 306 preferably is operating at a pressure within the range of from 40 to 140 pounds per square inch absolute (psia).

Within column 306 the feed air is separated by cryogenic rectification into a nitrogen gas stream 309 and enriched oxygen liquid stream 307. The nitrogen gas stream is withdrawn from upper portion of column 306 generally having a purity of greater than about 95% nitrogen, and preferably in the range of from about 98% nitrogen to about 99.9999% nitrogen or greater. Portion 326 of nitrogen gas stream 309 is passed into top condenser 308 wherein it is condensed against an enriched oxygen liquid stream and then passed as stream 317 back into column 306 as reflux. If desired, portion 320 of liquid nitrogen stream 317 may be recovered as liquid nitrogen product 318. The enriched oxygen liquid stream, having a nitrogen concentration generally within the range of from about 55% to about 75%, preferably from about 60 to about 70%, is removed from the lower portion of column 306 as enriched oxygen liquid stream 307, reduced in pressure through valve 334, and passed as stream 327 into top condenser 308 wherein it boils to carry out the condensation of nitrogen gas stream 326.

Withdrawn nitrogen gas stream 309 is warmed by passage through main heat exchanger 303 in indirect heat exchange with feed air thereby cooling the feed air. Thereafter, warmed nitrogen gas stream 323 is recovered.

Nitrogen-containing waste fluid is withdrawn from top condenser 308 of the rectification column system as stream 312, which then partially traverses main heat exchanger 303 and is then expanded through turbo expander 313 to a pressure within the range of from 20 psia to atmospheric pressure. Cooled expanded through expander 313 waste fluid 314 is then warmed by passage through main heat exchanger 303 in indirect heat exchange with feed air to carry out cooling of the feed air thus providing refrigeration into the cryogenic rectification column system with the feed air to drive or carry out the cryogenic rectification of the feed air. The resulting warmed waste fluid is removed from main heat exchanger 303 as waste stream 316.

In this particular application, as in FIG. 3, the last stage of the of base load air compressor 302 must be designed to operate stably and safely away from surge with the fractionally reduced main feed air flow there. This arrangement affords turbine power utilization and, therefore, power reduction of the main feed air compressor driver. Although the additional small electric motor, supplementing the turbine, slightly increases the capital cost of the turbine, it is still economically advantageous to do so.

Figure 4:
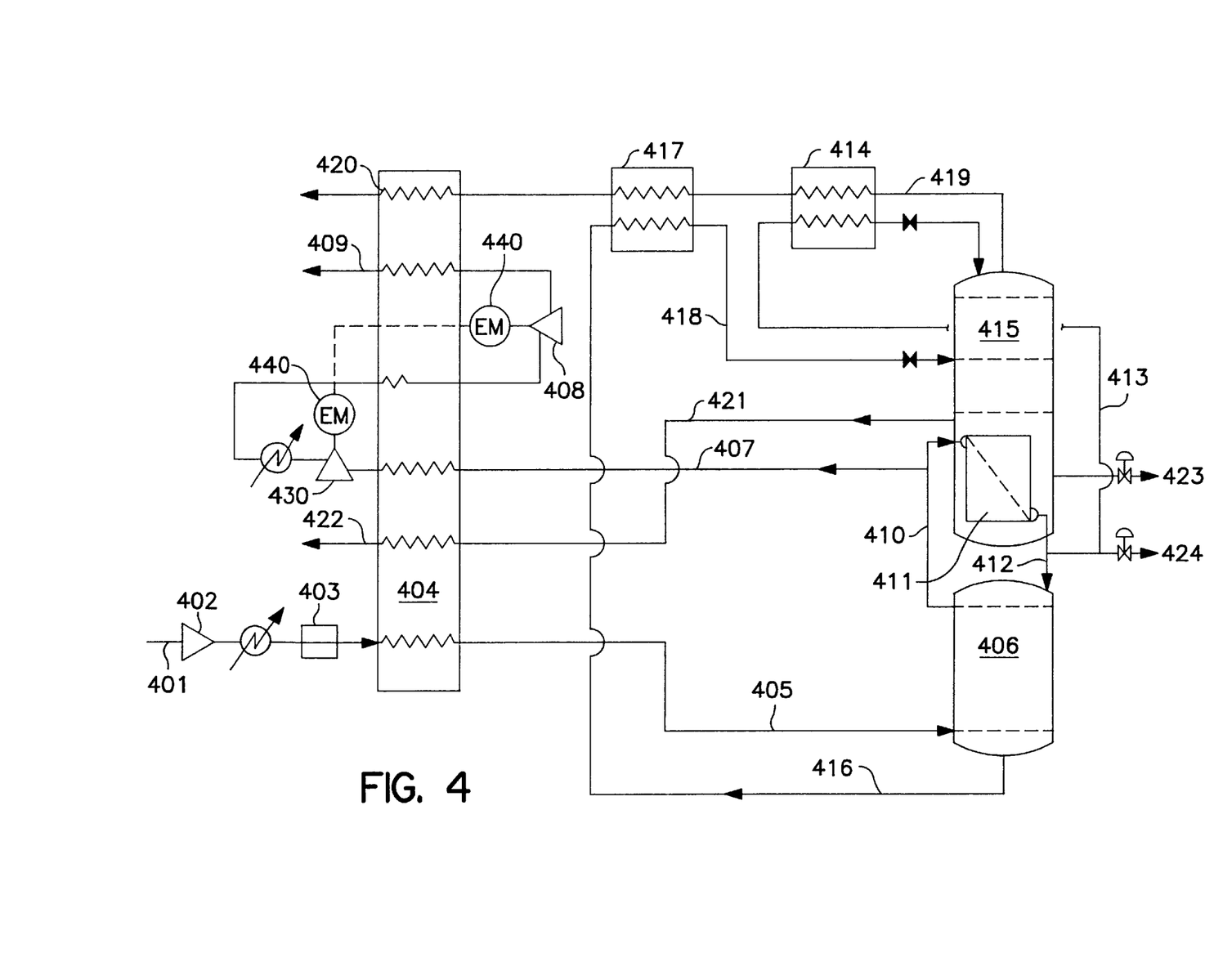
FIG. 4 is a flow schematic diagram of a gaseous oxygen plant with partial liquid nitrogen/oxygen production.

FIG. 4 represents one particular embodiment of a gaseous oxygen production cycle presented for illustrative purposes. The invention may be employed with any suitable cryogenic rectification plant. It is particularly useful in an oxygen producing plant with either upper column air expansion or, as shown on FIG. 4, with shelf nitrogen expansion, wherein a waste nitrogen stream from a rectification column is expanded to generate refrigeration. The expanded waste stream is passed in indirect heat exchange with incoming feed air to cool the feed air and thus provide refrigeration into the rectification column system to drive the rectification.

In FIG. 4, the booster compressor stage can be effectively used to increase the refrigeration power of the turbine by boosting the turbine stream pressure (and energy) prior to its expansion in the turbine itself. The appropriately sized, already in place, electric motor will provides the extra power for this mode of operation, when it is so required.

Referring now to FIG. 4, gaseous mixture containing nitrogen and oxygen, i.e., feed air 401, is compressed in base load feed compressor 402, pre-cleaned from impurities in pre-purifier 403, and then passed through main heat exchanger 404. Within main heat exchanger 404 the compressed feed air is cooled by indirect heat exchange with the product and other return cold streams. The compressed and cooled feed air is then passed as stream 405 into lower column 406 of a cryogenic rectification column system.

The cryogenic rectification column system illustrated in FIG. 4 comprises lower column 406, upper column 415, and main condenser 411. Lower column 406 preferably is operating at a pressure within the range of from 40 to 140 pounds per square inch absolute (psia). Within lower column 406 the feed air is separated by cryogenic rectification into a nitrogen gas stream 410 and enriched oxygen liquid 416. A portion of nitrogen gas stream 410 is passed into the top of main condenser 411 wherein it is condensed against boiling oxygen liquid of the upper column and then passed as liquid nitrogen stream 412 back into lower column 406 as reflux.

The enriched oxygen liquid stream, having a nitrogen concentration generally within the range of from 60 to 70 percent, is removed from the lower portion of lower column 406 as stream 416, cooled in heat exchanger 417 against product or waste nitrogen stream 419, reduced in pressure and passed as stream 418 into upper column 415. Waste nitrogen stream 419 then passes through heat exchangers 414, 417 and 404 to emerge as waste nitrogen stream 420. The upper column preferably is operating at a pressure within the range of 15 to 25 pounds per square inch absolute (psia). Gaseous oxygen product is removed from the main condenser liquid as stream 421, which is warmed up against the feed air in main heat exchanger 404 and withdrawn as gaseous oxygen product stream 422.

Nitrogen gas stream is withdrawn from the recirculating high pressure vapor stream of main condenser 411 as stream 407. It is then warmed-up by the feed air in one of main heat exchanger 404 passages and compressed in booster compressor 430. After removal of the heat of compression and partial pre-cooling in another passage of main heat exchanger 404, this stream is expanded into expander 408 to produce required refrigeration to sustain the rectification process. Cooled, expanded waste fluid stream is then warmed by yet another passage through main heat exchanger 404 in indirect heat exchange with feed air to carry out the cooling of the feed air to drive or carry out the cryogenic rectification. This resulting warm nitrogen stream is removed from main heat exchanger 404 and discharged as waste stream 409. Turboexpander 408 is aided by electric motor/generator 440 in driving booster compressor 430. The booster compressor stage here can be effectively used to increase the refrigeration power of the turbine by, first, boosting the pressure (and energy) of turbine stream 407 prior to its expansion in the turbine itself. The appropriately sized, already in place, electric motor will provides the extra power for this mode of operation, when it is so required. The turbine and the booster stage are sized for the maximum duty, i.e. pressure ratio.

Lower turbine power operation can be achieved by lowering the turbine inlet pressure while keeping its flow fairly constant. This can be accomplished with the utilization of suction guide vanes at the booster compressor inlet. Suction guide vanes modulation will also modulate the booster discharge pressure and the turbine output (refrigeration produced), without otherwise significantly affecting the turbine flow, and therefore, the process cycle itself.

Another liquid nitrogen stream 413 is withdrawn from the returning liquid nitrogen (nitrogen condensate) stream 412 from the main condenser and injected as reflux into the hat of the upper column after partial cooling in heat exchanger 414. This reflux stream is necessary to drive the upper low pressure rectification column to produce high purity nitrogen and oxygen product.

The additional power to the cryogenic turboexpander is available from the electric motor through the boot-strapped, with the booster compressor, stream prior to its expansion in the turboexpander itself. This affords additional refrigeration on demand, when needed, without otherwise affecting the process cycle itself. If desired, a portion of liquid nitrogen stream 412 may be recovered as liquid nitrogen product 424. Similarly, a portion of the oxygen may be recovered as liquid oxygen product 423 from the boiling oxygen liquid at the bottom of the upper column 415. Typically, gaseous oxygen product stream 422 and liquid oxygen product 423 have an oxygen purity of greater than 95% purity. Preferably, the oxygen purity exceeds 99.5%.

Figure 5:
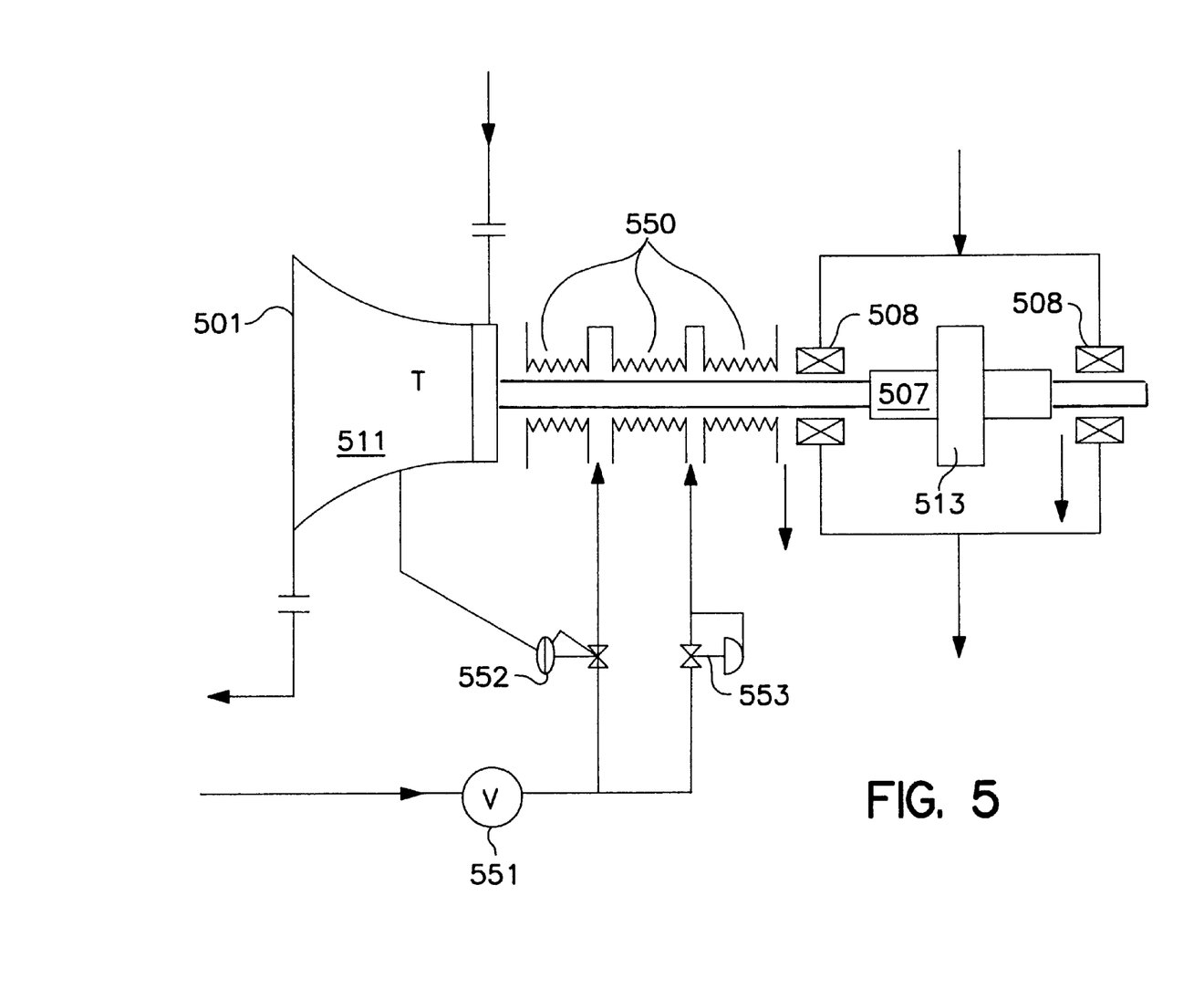
FIG. 5 is a schematic diagram of a shaft seal arrangement.

Bearing lubricant migration to the cold process fluid is prevented by the expander shaft seal system via warm buffer seal gas introduced into the expander-end shaft seal as illustrated in FIG. 5. A seal system is any device, which will contain buffer seal gas around the shaft-rotor. Typically, it may contain a shaft seal with labyrinths 550, which create a series of localized pressure buildups along the shaft 507, countering the flow of both lubricant from bearing 508 to impeller 511 of turbine expander 501 and cold process gas from expander wheel 511 to the bearings and gear case 104. This effectively isolates the bearings and the gear case proper from the process stream, thereby assuring reliable turboexpander operation without oil freeze-up in the bearings or process stream contamination with bearing lubricant.

Warm sealing gas is provided to the system within the range of from 40° F. to 150° F. typically through supply valve 551. The sealing gas is preferably the same as the process stream, such as nitrogen or feed air. To minimize expander efficiency degradation, the amount of high pressure warm sealing gas, flowing into the expander housing, is kept to a minimum with pressure regulator 552, by introducing it at a pressure only slightly higher than the process stream pressure at the point of its injection to that process stream. A low pressure seal gas is also provided to the system with back pressure regulator 553, set at approximately 15 pound per square inch gauge (psig) pressure. This low pressure seal gas supply assures that under no circumstances there will be oil contamination of the process stream. It essentially provides all the seal gas to the system during start up and shut down of the turbine.

As can be appreciated by one skilled in the arts, this seal gas arrangement is necessary only at the expander-end rotor of this cryogenic turboexpander. There is no seal gas required on the other, warm end of the turbine rotor, as well as at either end of the compressor stage rotor. Instead, the compressor loop process gas, such as air or nitrogen, is allowed to escape through a similar labyrinth shaft seal located between the compressor impeller and the compressor-end bearing.

The economic advantage of the present invention can be summarized as follows:

For small size gas plants (50 to 200 TPD) requiring booster product compressor, the corresponding capital cost of such a compressor (including skid, piping, foundation, cooling water, electrical connections, controls, etc.) is approximately $250,000. Then, there is the cost of the turbine with its loading device (compressor brake, oil brake, or electric motor).

The turbine/electric motor/generator driven booster compressor of the present invention would nicely substitute the product compressor machine, thereby saving all the capital first cost associated with it, at the expense of slightly costlier turbine. This way, at the minimum, one would save between $100,000 and $200,000 per plant (50 to 200 TPD) plus the additional savings in process power.

The following example illustrates the economic benefits of the present invention:

A cryogenic oxygen/nitrogen producing gas plant of 100 TPD (tons per day) capacity would require about 50 SHP (shaft horsepower) refrigeration producing cryogenic turbine, rotating at approximately 10,000 RPM (revolutions per minute) for peak efficiency. Furthermore, to boost the product nitrogen stream pressure, say to 30 psia (pounds per square inch absolute), we would need a product nitrogen booster compressor of approximately 100 SHP, rotating at about 27,000 RPM for its optimum efficiency operation. Employing the cryogenic turbine/electric motor driven booster compressor of the present invention, with the electric motor we need to purchase only the 50 SHP power deficit between the compressor power requirements and the turbine output.

Without the benefits of the present invention, one would have had to purchase 175 SHP, which is 125 SHP more, because now one would have had to purchase not only the full 100 SHP for the product compressor, but also pay (in the base load feed air compressor) for the wasted power of the cryogenic turbine, compounded by the inefficiencies of both machines, the feed air compressor and the cryogenic turbine (50 SHP at the cryogenic turbine now becomes about 75 SHP at the base load air compressor shaft). In addition, in the latter case, one must incur the cost of the installation and operation of a whole new booster compressor machine, including skid, piping, foundation, cooling water, electrical connections, controls, etc.

With the present invention one would save approximately $100,000 capital, since the installation cost of this particular booster compressor machine alone is about $150,000, the cost for the stand alone cryogenic turbine is about $100,000 and the higher cost of the turbine/electric motor/generator driven booster compressor of the present invention is about $150,000. At 0.05$/KWH for power, one would save an additional approximately $50,000 per year in operating power expenses alone.

To realize the above described economic advantages one needs to have a special gear case to interconnect the process gas turbine, the motor/generator and the booster compressor. The gear case, housing the turbine, booster compressor and the electric motor/generator of the present invention is located preferably in close proximity, and adjacent, to the "cold box", i.e. where one normally would have located the turbine itself.

This arrangement is economically preferable, because it affords the utilization of an "ordinary" turbine stage and minimizes the potential heat leakage into the turbine and its (cold cryogenic) piping, in that the turbine housing is "submerged" into the cold box and thermally insulated by perlite or some other kind of thermal insulation. It is easier and more cost effective to locate the booster compressor close to the cold box, next to the turbine, rather than the reverse, piping the cold (cryogenic) turbine stream to the warm end equipment of the plant, if the turbine was located, for example, next to the base load air machine or some other compressor.

The booster compressor stage and the electric motor/generator are located on the opposite (of the cold box) side of the gear case together with all warm end (booster compressor) piping. The gear case is horizontally split for an independent access to each of the three major components, i.e. turbine, compressor, electric motor or gears and bearing housings. Thus, by removing the gear case cover one can easily access and independently remove any one of the components without affecting the other two.

As indicated above and shown in FIG. 4, the booster compressor stage here can be effectively used to increase the refrigeration power of the cryogenic turbine by boosting the turbine stream pressure prior to its expansion in the turbine itself. In this process, the expanding (in the turbine) stream is compressed by a booster compressor stage, which in turn loads the turbine.

Traditionally, in a typical gas plant, the liquid production normally is modulated by changing the turbine flow. However, at some point, a further increase in turbine flow will result in a significant decrease in recovery and a high total base load air compressor power penalty. This is the point, where the process cycle cannot economically make more liquid product.

With the turbine driven, motor assisted booster of the present invention, the additional power (e.g., to boost the turbine stream pressure) is provided by the properly sized electric motor and booster compressor. In this case, the turbine and the booster stage are sized for the maximum duty, i.e. pressure ratio. The additional power will be provided by the electric motor.

Lower turbine power operation can be achieved by lowering the turbine inlet pressure while keeping its flow fairly constant. This can be accomplished with the utilization of suction guide vanes at the booster compressor inlet. Suction guide vanes modulation will also modulate the booster discharge pressure and the turbine output (refrigeration produced), without significantly affecting the turbine flow, and therefore, the process cycle itself.

In the particular case of 100 TPD plant of above, where this invention is practiced to self boost the turbine stream inlet energy in the boot-strapped booster compressor via the electric motor as illustrated in FIG. 4, the gas plant can now produce additional liquid product just by purchasing extra power with the electric motor. For example, by increasing the load on the turbine with the inlet guide vanes of the booster compressor or by other means from 50 SHP to 75 SHP, an additional 4% of the product nitrogen can be produced as liquid without otherwise affecting the process cycle itself. This would have been difficult to accomplish without the turbine driven, motor assisted booster compressor of the present invention.

The operating efficiency of both compressor stage and cryogenic expander stage is not compromised by the combination of both in one machine. It is suitable for the nitrogen producing plants with waste expansion or air expansion. In some applications, such as oxygen producing air separation plants, or even smaller nitrogen producing plants, this machine allows for additional liquid production, because of the additional refrigeration, made available through the use of the electric motor assistance. The machine is especially suited for nitrogen producing plants through separation of air by cryogenic distillation with waste expansion or air expansion cycle. It can be also used in other cryogenic processes, such as hydrogen, natural gas, or similar chemical processes requiring an expansion engine and compressor stage combination of low first cost and state of art performance.

By the use of the cryogenic turbine motor/generator assisted booster compressor of this invention, nitrogen or oxygen products can be produced, employing cryogenic rectification, with lower overall operating costs without experiencing high capital cost penalty. Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. A gas compression assembly for operating a refrigeration system, the compression assembly comprising an electric motor/generator, a compressor, an expansion turbine having a turbine inlet and a turbine outlet, wherein said compressor, turbine and motor/generator are integrally connected via a gear drive, a conduit for passing at least one portion of a gas in series through said compressor to said turbine and a controlling means to regulate the pressure of at least one portion of said gas passing through said turbine, and said assembly has an operating temperature of less than about 250 K in said turbine inlet.

2. The compression assembly of claim 1 wherein said assembly has an operating temperature of less than about 150 K in said turbine outlet.

3. The compression assembly of claim 1 wherein said assembly has an operating temperature of less than about 100 K in said turbine outlet.

4. The compression assembly of claim 1 wherein said system provides refrigeration to liquefy at least one gaseous component.

5. The compression assembly of claim 1 wherein said system provides refrigeration for gas separation from at least a gaseous mixture into at least one gaseous component.

6. A refrigeration process comprising:
a) passing a gaseous mixture through a cryogenic rectification column system to separate said mixture into at least one gaseous product;
b) passing a portion of said gaseous product into an expansion turbine of a compression assembly comprising a turbine, a compressor and an electric motor/generator integrally connected via a gear drive, wherein said turbine has a turbine inlet and a turbine outlet;
c) passing at least one portion of said gaseous product in series through said compressor to said turbine; and
d) regulating the pressure of at least said Portion of said gaseous product using a controlling means, and said assembly has an operating temperature of less than about 250 K in said turbine inlet.

7. The process of claim 6 wherein said assembly has an operating temperature of less than about 150 K in said turbine outlet.

8. The process of claim 6 wherein said assembly has an operating temperature of less than about 100 K in said turbine outlet.

9. The process of claim 6 further comprising passing at least a portion of said gaseous mixture through said compressor to emerge as at least one compressed gaseous mixture.

10. The process of claim 6 further comprising compressing a portion of said gaseous mixture through a feed compressor prior to passing to said compression assembly and recombining the resulting gaseous mixture from said compression assembly with the remaining portion of said gaseous mixture from said feed compressor.

11. The process of claim 6 wherein said cryogenic rectification column system comprises a single column and a top condenser, wherein at least one portion of said gaseous mixture passes through said single column to emerge as at least one purified gaseous product.

12. The process of claim 6 wherein said cryogenic rectification column system comprises a lower column, an upper column and a main condenser, wherein at least one gaseous product passes through said compressor.

13. The process of claim 12 wherein air is separated into nitrogen of greater than about 99% purity and oxygen of greater than about 95% purity.

14. The process of claim 13 wherein said gaseous product passes through said compressor prior to passing through said turbine.

15. The process of claim 6 comprising:
a) passing a gaseous mixture containing nitrogen and oxygen through a cryogenic rectification plant comprising a single column to emerge as at least one nitrogen gas stream and one enriched oxygen liquid stream;
b) using said oxygen enriched liquid stream to condense and produce a liquid nitrogen stream from said nitrogen gas stream, such that a nitrogen waste stream emerges from said enriched oxygen liquid stream;
c) recovering a portion of said liquid nitrogen stream as a liquid nitrogen product therefrom;
d) recycling another portion of said liquid nitrogen stream into said column for refluxing;
e) passing another portion of said nitrogen gas stream through a compressor of a compression assembly comprising said compressor, a turbine expander, and a motor/generator integrally connected to a gear drive, wherein said turbine has an inlet operating temperature of less than about 250 K and wherein product nitrogen gas is recovered therefrom; and
f) expanding at least one portion of said nitrogen waste stream through said turbine.

16. The process of claim 6 comprising:
a) passing a gaseous mixture containing nitrogen and oxygen through a lower column of a two column cryogenic rectification plant to emerge as an enriched oxygen liquid stream and a nitrogen gas stream;
b) condensing at least one portion of said nitrogen gas stream in a condenser within an upper column to produce a liquid nitrogen stream;
c) passing at least one portion of said liquid nitrogen stream to said lower column for refluxing; passing at least one portion of said liquid nitrogen stream to said upper column for refluxing; and recovering at least one portion of said liquid nitrogen stream as liquid nitrogen product;
e) passing said enriched oxygen liquid stream to said upper column;
f) removing a waste nitrogen stream from said upper column;
g) recovering at least one portion of a liquid oxygen product and at least one portion of a gaseous oxygen product from said upper column; and
h) passing another portion of said nitrogen gas stream through a compressor of a compression assembly comprising said compressor, a turbine expander, and a motor/generator integrally connected to a gear drive, wherein said turbine has an inlet operating temperature of less than about 250 K and wherein an expanded product nitrogen gas is recovered therefrom.

* * * * *